(12) United States Patent
Kim et al.

(10) Patent No.: US 7,586,550 B2
(45) Date of Patent: Sep. 8, 2009

(54) LIQUID CRYSTAL DISPLAY PANEL AND MANUFACTURING METHOD THEREOF

(75) Inventors: Jeong Il Kim, Incheon (KR); Dong Gyu Kim, Yongin-si (KR); Yeong Keun Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 123 days.

(21) Appl. No.: 11/487,075

(22) Filed: Jul. 14, 2006

(65) Prior Publication Data
US 2007/0165149 A1 Jul. 19, 2007

(30) Foreign Application Priority Data
Jan. 16, 2006 (KR) ............. 10-2006-0004233

(51) Int. Cl.
*G02F 1/1343* (2006.01)
*G02F 1/1347* (2006.01)

(52) U.S. Cl. ............................. 349/39; 349/79
(58) Field of Classification Search ............ 349/39, 349/79
See application file for complete search history.

(56) References Cited
U.S. PATENT DOCUMENTS

| | | | |
|---|---|---|---|
| 5,608,558 A * | 3/1997 | Katsumi ............. | 349/192 |
| 6,323,490 B1 * | 11/2001 | Ikeda et al. ............. | 250/370.09 |
| 6,707,441 B1 * | 3/2004 | Hebiguchi et al. ............. | 345/92 |
| 2001/0015715 A1 * | 8/2001 | Hebiguchi et al. ............. | 345/92 |
| 2002/0097349 A1 * | 7/2002 | Park ............. | 349/38 |
| 2003/0128306 A1 * | 7/2003 | Kai ............. | 349/39 |
| 2003/0201438 A1 * | 10/2003 | Park ............. | 257/59 |
| 2004/0085503 A1 * | 5/2004 | Kim et al. ............. | 349/141 |
| 2008/0062104 A1 * | 3/2008 | Lee ............. | 345/90 |

* cited by examiner

*Primary Examiner*—K. Cyrus Kianni
(74) *Attorney, Agent, or Firm*—Cantor Colburn LLP

(57) ABSTRACT

A liquid crystal display (LCD) panel and manufacturing method thereof capable of ensuring an aperture ratio while reducing the number of data lines by a change of an arrangement structure of subpixels includes a plurality of subpixels constituting a display region, a plurality of thin film transistors (TFTs) connected respectively to the plurality of subpixels, a plurality of gate lines connected to the TFTs and formed along long sides of the subpixels, a plurality of data lines connected to the TFTs and formed along short sides of the subpixels, a plurality of storage lines formed to pass through the subpixels along the short sides of the subpixels, a first common storage line connected commonly to one end of each of the plurality of storage lines, and a second common storage line connected commonly to an opposite end of each of the plurality of storage lines.

11 Claims, 5 Drawing Sheets

LIQUID CRYSTAL DISPLAY PANEL AND MANUFACTURING METHOD THEREOF

This application claims priority to Korean Patent Application No. 2006-0004233, filed on Jan. 16, 2006, and all the benefits accruing therefrom under 35 U.S.C. §119, and the contents of which in its entirety are hereby incorporated by reference.

BACKGROUND OF THE INVENTION

1. Field of the Invention

The present invention relates to a liquid crystal display ("LCD") apparatus, and more particularly, to an LCD panel and manufacturing method thereof capable of reducing the number of data lines and minimizing a reduction in an aperture ratio caused by storage lines.

2. Description of the Related Art

An LCD apparatus displays an image by using electro-optical properties of liquid crystals disposed between electrodes of an LCD panel. The LCD apparatus includes the LCD panel for displaying an image through a pixel matrix and a driving circuit for driving the LCD panel. The LCD apparatus further includes a backlight unit for supplying light from the rear of the LCD panel because the LCD panel is a non-emitting device. The LCD apparatus is widely used in display devices ranging from small-sized display devices such as mobile communication terminals, notebook computers and LCD TVs to large-sized display devices.

The LCD panel in which pixels each consisting of red, green and blue subpixels are arrayed in a matrix form displays an image by adjusting the transmittance of light irradiated from the backlight unit while the respective subpixels vary the arrangement of the liquid crystals according to a data signal. The subpixels drive the liquid crystals by charging a difference voltage between a data signal supplied to a pixel electrode through a thin film transistor ("TFT") of a switching element and a common voltage supplied to a common electrode. A plurality of gate integrated circuits ("ICs") for driving gate lines connected to TFTs and a plurality of data ICs for driving data lines are connected to the LCD panel. The data ICs have a more complicated circuit structure than that of the gate ICs because the data ICs should convert digital video data into an analog data signal.

In order to lower the cost, the LCD panel has been developed to reduce the number of data lines while maintaining resolution. To reduce the number of data lines, a method of changing an arrangement structure of the subpixels is used. In this case, an aperture ratio should be ensured so as not to degrade luminance and picture quality.

BRIEF SUMMARY OF THE INVENTION

The present invention thus provides an LCD panel and manufacturing method thereof capable of ensuring an aperture ratio while reducing the number of data lines by changing an arrangement structure of the subpixels.

In accordance with one exemplary embodiment of the present invention, there is provided an LCD panel including a plurality of subpixels constituting a display region, a plurality of thin film transistors (TFTs) connected respectively to the plurality of subpixels, a plurality of gate lines connected to the TFTs and formed along long sides of the subpixels, a plurality of data lines connected to the TFTs and formed along short sides of the subpixels, a plurality of storage lines formed to pass through the subpixels along the short sides of the subpixels, a first common storage line connected commonly to one end of each of the plurality of storage lines, and a second common storage line connected commonly to the other end of each of the plurality of storage lines.

The plurality of subpixels includes red, green and blue subpixels, and the red, green and blue subpixels are alternately repeatedly arrayed along the data lines.

The first and second common storage lines are formed of a first metal layer which is the same as the gate lines, and the storage lines are formed of a second metal layer which is the same as the data lines.

The LCD panel further includes a plurality of first contact electrodes connecting the first common storage line to the plurality of storage lines, and a plurality of second contact electrodes connecting the second common storage line to the plurality of storage lines.

Each of the first and second contact electrodes is formed of a third conductive layer connecting the common storage lines to the storage lines through contact holes exposing the common storage lines and the storage lines.

The first common storage line is connected to an upper part of the plurality of storage lines via an upper non-display region out of a non-display region encompassing the display region, and the second common storage line is connected to a lower part of the plurality of storage lines via a lower non-display region. The second common storage line extends to the upper non-display region along right and left non-display regions in the lower non-display region.

The LCD panel further includes a first common pad connected to opposing ends of the first common storage line, and a second common pad connected to opposing ends of the second common storage line.

Alternatively, the LCD panel further includes a common pad connected commonly to the corresponding opposing ends of each of the first and second common storage lines.

The LCD panel further includes gate drivers installed in the right and left non-display regions, for separately driving the plurality of gate lines. The second common storage line passes by an outbound side of the gate drivers.

In accordance with another exemplary embodiment of the present invention, there is provided a method of manufacturing an LCD panel, including forming a gate line, a data line and a TFT connected to the gate and data lines on a substrate, forming a subpixel connected to the TFT in each subpixel region defined by a crossing structure of the gate and data lines, the subpixel region having a long side in parallel with the gate line and a short side in parallel with the data line, forming a storage line passing through the pixel electrode in a direction of the short line of the subpixel region, and forming first and second common storage lines connected respectively to one end and an opposite other end of the storage line.

The first and second common storage lines are formed of a first metal layer which is the same as the gate line, and the storage line is formed of a second metal layer which is the same as the data line.

The method of manufacturing an LCD panel further includes forming a first contact electrode for connecting the first common storage line to the storage line and a second contact electrode for connecting the second common storage line to the storage line.

The forming the first and second contact electrodes includes forming contact holes for exposing the common storage lines and the storage line, and forming the first and second contact electrodes of a third conductive layer for connecting the common storage lines to the storage line through the contact holes.

The method of manufacturing an LCD panel further includes forming a first common pad connected to opposing ends of the first common storage line and a second common pad connected to opposing ends of the second common storage line.

Alternatively, the method of manufacturing an LCD panel further includes forming a common pad connected commonly to opposing ends of the first and second common storage lines.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE INVENTION

Figure 1:
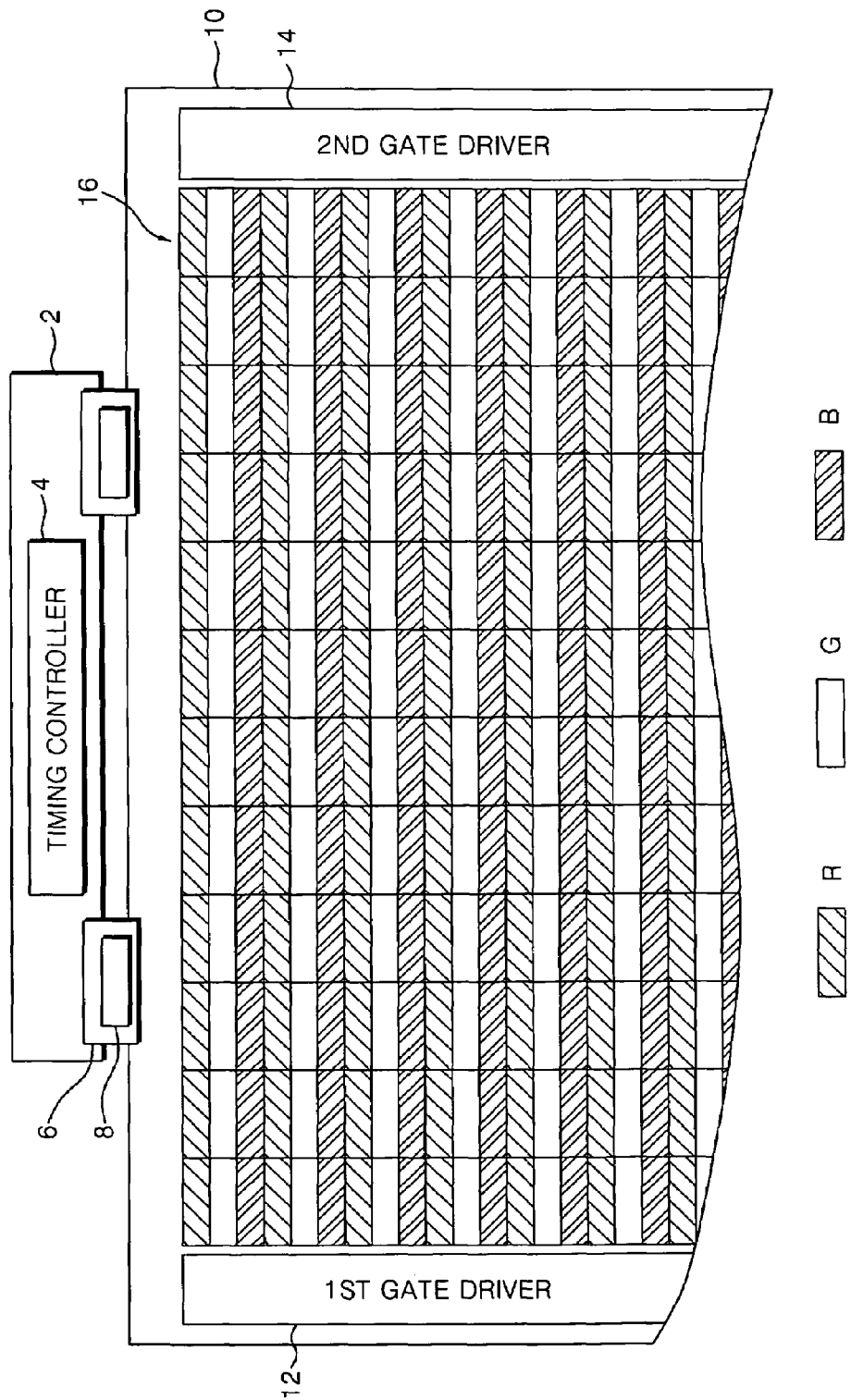
FIG. 1 is a plan view illustrating part of an exemplary embodiment of an LCD apparatus according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The exemplary embodiments of the present invention will now be described with reference to FIGS. 1 to 5.

FIG. 1 is a plan view schematically illustrating part of an exemplary embodiment of an LCD apparatus according to the present invention.

The LCD apparatus illustrated in FIG. 1 includes an image display unit 16, an LCD panel 10 in which first and second gate drivers 12 and 14, respectively, for driving gate lines of the image display unit 16 are formed, a circuit film 6 mounting a data IC 8 for driving data lines of the image display unit 16 thereon and being connected between a printed circuit board ("PCB") 2 and the LCD panel 10, and a timing controller 4 mounted on the PCB 2.

The image display unit 16 of the LCD panel 10 displays an image by a plurality of pixels arrayed in a matrix form, each pixel consisting of red (R), green (G) and blue (B) subpixels. A TFT substrate where TFTs are formed with respect to the R, G and B subpixels and a color filter substrate where color filters are formed are sealed together with liquid crystals therebetween, thereby forming the image display unit 16. Gate lines, data lines and pixel electrodes connected to the TFTs are further formed on the TFT substrate. A common electrode for driving the liquid crystals together with the pixel electrodes is formed on the TFT substrate or the color filter substrate. The R, G and B subpixels are alternately repeatedly arranged in the vertical direction and the subpixels of the same color are horizontally arranged in a stripe shape. In other words, the image display unit 16 has a structure in which an R horizontal line consisting of a plurality of R subpixels, a G horizontal line consisting of a plurality of G subpixels, and a B horizontal line consisting of a plurality of B subpixels are alternately repeatedly arrayed in the vertical direction. Each of the R, G and B subpixels has a rectangle shape of which longer sides of each rectangle are oriented in a horizontal direction and the other sides are oriented in a vertical direction as illustrated in FIG. 1. By the vertical arrangement of the R, G and B subpixels on the image display unit 16, the inventive LCD panel reduces the number of data lines to one third compared to the prior art LCD panel in which the R, G and B subpixels are arrayed in the horizontal direction. As a result, the number of data ICs 8 for driving the data lines is reduced. The magnitude of the gate drivers 12 and 14 increases because the number of gate lines increases as the number of data lines decreases due to the vertical arrangement of the R, G and B subpixels. However, since the circuit structure of the gate drivers 12 and 14 is simpler than that of the data ICs 8, the manufacturing cost is less. Especially, since the gate drivers 12 and 14 are installed within the LCD panel 10 using an amorphous silicon thin film, the manufacturing cost can be even less.

The first and second gate drivers 12 and 14 are located at opposing sides of the image display unit 16 and separately drive the gate lines. For example, the first gate driver 12 drives the odd-numbered gate lines and the second gate driver 14 drives the even-numbered gate lines. The first and second gate drivers 12 and 14 are comprised of shift registers including a plurality of TFTs. The first and second gate drivers 12 and 14 are each formed on the TFT substrate of the LCD panel 10, together with TFTs and a plurality of signal lines of the image display unit 16, and installed in a non-display region.

Each of a plurality of data ICs 8 for separately driving the data lines of the image display unit 16 is mounted on the circuit film 6. The circuit film 6 is attached to the LCD panel 10 and the PCB 2 through an anisotropic conductive film ("ACF"). A tape carrier package ("TCP") or a chip-on-film ("COF") is used as the circuit film 6 on which the data IC 8 is mounted. It is possible to directly mount the data IC 8 on the TFT substrate of the LCD panel 10 by using chip-on-glass ("COG") technology without using the circuit film 6.

The timing controller 4 mounted on the PCB 2 controls the data ICs 8 and the first and second gate drivers 12 and 14. A plurality of data signals and data control signals from the timing controller 4 are supplied to each data IC 8 via the PCB 2 and the circuit film 6, and a plurality of gate control signals from the timing controller 4 is supplied to the first and second gate drivers 12 and 14 via the PCB 2, the circuit film 6, and the TFT substrate of the LCD panel 10.

The first and second gate drivers 12 and 14 sequentially drive the gate lines of the image display unit 16 by using the gate control signals from the timing controller 4 and gate ON and OFF voltages from a power source (not shown). The data ICs 8 convert digital data signals from the timing controller 4 into analog data signals by using gamma voltages from a gamma voltage part (not shown) and supply the analog data signals to the data lines in synchronization with each horizontal period during which the gate lines of the image display unit 16 are driven.

Figure 2:
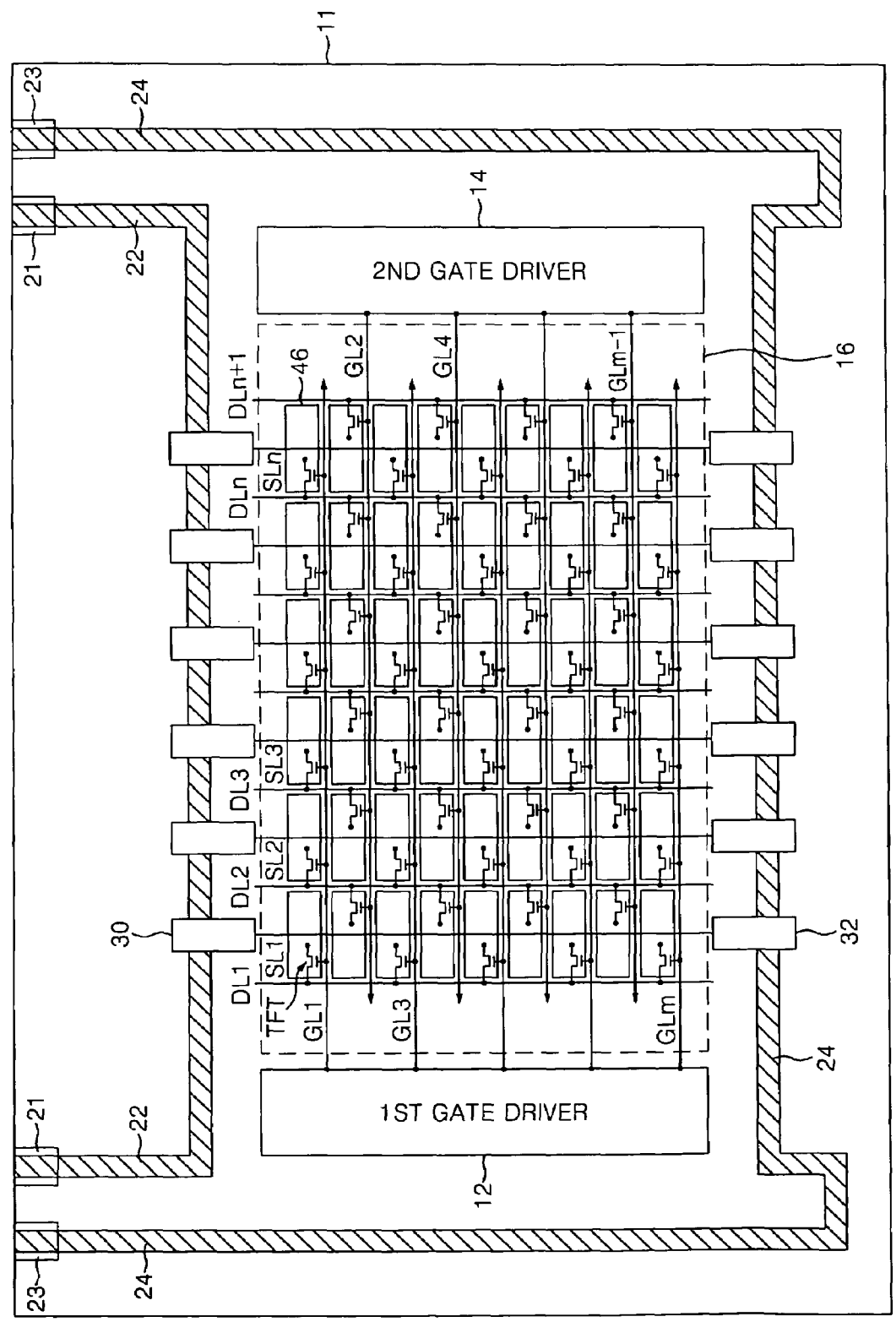
FIG. 2 is a diagram illustrating an exemplary embodiment of a TFT substrate of an LCD panel according to the present invention.

FIG. 2 is a plan view schematically illustrating the TFT substrate of the LCD panel shown in FIG. 1.

A TFT substrate 11 shown in FIG. 2 is divided into a display region corresponding to the image display unit 16 of the LCD panel 10 shown in FIG. 1 and a non-display region encompassing the display region. Gate lines GL1 to GLm and data lines DL1 to DLn+1 are formed in a crossing structure in the display region of the TFT substrate 11, and a pixel electrode 46 and a TFT are formed in each subpixel region defined by the crossing structure. The TFT supplies a data signal from the data line to the pixel electrode 46 in response to a gate signal from the gate line. The pixel electrode 46 has a longer side in the horizontal direction than the other side in the vertical direction as a result of the vertical direction arrangement of the R, G and B subpixels. The pixel electrode 46 determines the size and shape of a subpixel together with a color filter of the color filter substrate.

In order to prevent liquid crystals from being degraded, the polarity of the data signal supplied to the data lines DL1 to DLn+1 should be inverted at a predetermined period. A dot inversion scheme provides excellent picture quality by driving each subpixel to have opposite polarity to horizontally and vertically adjacent subpixels. For the dot inversion scheme, however, the data signal supplied to the data lines DLI to DLn+1 should be inverted on a subpixel basis. Then the swing width and driving frequency of the data signal increase, and thus the dot inversion scheme has a shortcoming in terms of power consumption. To solve such a problem, the connecting directions of the TFTs connected to the data lines DL1 to DLn+1 are constructed to be alternately changed along the vertical direction. For example, the TFTs of odd-numbered horizontal lines connected to the odd-numbered gate lines GL1, GL3, . . . , GLm are connected to the pixel electrodes 46 on the right of the data lines DL1 to DLn. The TFTs of even-numbered horizontal lines connected to the even-numbered gate lines GL2, GL4, . . . , GLm−1 are connected to the pixel electrodes 46 on the left of the data lines DL2 to DLn+1. Accordingly, the polarity of the data signal supplied to each of the data lines DL1 to DLn+1 is opposite to that of the data signal supplied to the adjacent data lines. Even if the polarity of the data signal is inverted only on a frame basis, the pixel electrode 46 charges the data signal of the opposite polarity to the horizontally and vertically adjacent pixel electrodes 46 to be driven by the dot inversion scheme.

Figure 3:
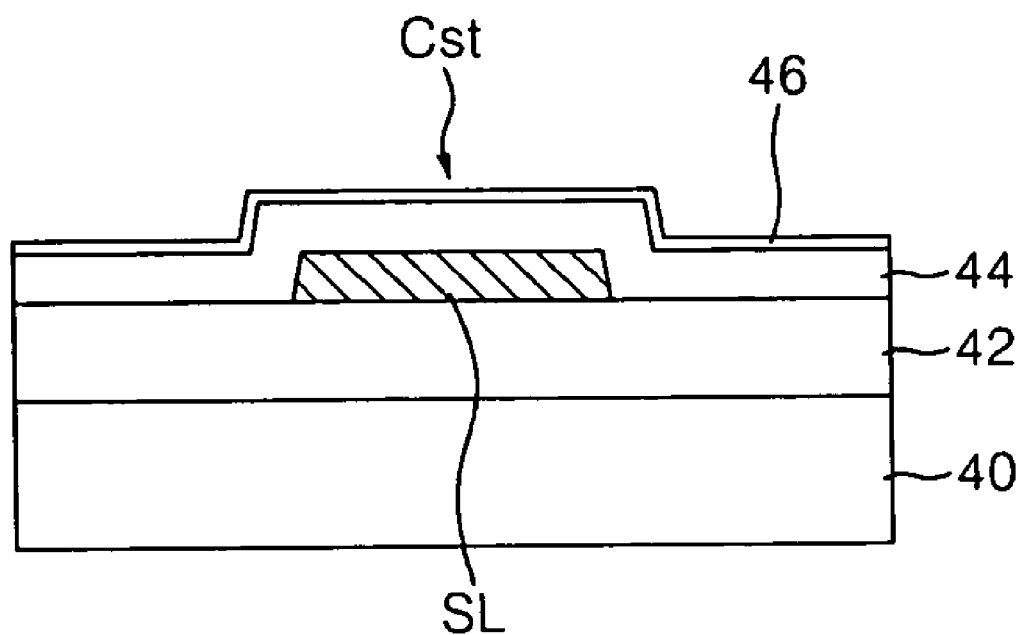
FIG. 3 is an enlarged cross-sectional view of a storage capacitor formed in one subpixel region shown in FIG. 2.

Storage lines SL1 to SLn for forming storage capacitors of the subpixels are formed in parallel with the data lines DL1 to DLn+1 in the display region of the TFT substrate 11. The storage lines SL1 to SLn cross the gate lines GL1 to GLm and pass through the pixel electrodes 46 in the vertical (short side) direction. Since an overlapped area of the storage line with the pixel electrode 46 is smaller than when the storage lines SL1 to SLn are formed in parallel with the gate lines GL1 to GLm and overlapping the horizontal (long side) direction of the pixel electrode 46, an aperture ratio can be improved. The storage lines SL1 to SLn are formed of a source/drain metal by the same mask process as the data lines DL1 to DLn+1. In other words, a storage line SL is formed of a source/drain metal on a gate insulating layer 42 as illustrated in FIG. 3, and the gate insulating layer 42 is formed on an insulating substrate 40. A storage capacitor Cst of each subpixel is formed such that the pixel electrode 46 overlaps the storage line SL with a passivation layer 44 therebetween.

The first and second gate drivers 12 and 14 for separately driving the gate lines GL1 to GLm are respectively formed in the left and right non-display regions, respectively, of the TFT substrate 11 with the display region therebetween. For instance, the first gate driver 12 in the left non-display region drives the odd-numbered gate lines GL1, GL3, . . . , GLm, and the second gate driver 14 in the right non-display region drives the even-numbered gate lines GL2, GL4, . . . , GLm−1. The first and second gate drivers 12 and 14 are comprised of a plurality of TFTs and they are formed together with TFTs of the display region.

First and second common storage lines 22 and 24 are connected commonly to the storage lines SL1 to SLn, and a plurality of first and second contact electrodes 30 and 32, respectively, for connecting the first and second common storage lines 22 and 24 to the storage lines SL1 to SLn. The first and second common storage lines 22 and 24 are formed in the non-display region encompassing the image display unit of the TFT substrate 11. The first and second common storage lines 22 and 24 are simultaneously connected to the upper and lower parts of the storage lines SL1 to SLn, respectively. If any one of the first and second common storage lines 22 and 24 is shorted, a common voltage can be supplied through the other common storage line. That is, the first and second common storage lines 22 and 24 serve as mutual redundancy.

The first common storage line 22 is formed in the upper non-display region of the TFT substrate 11 and is connected commonly to the upper part of the storage lines SL1 to SLn through the first contact electrodes 30. The first common storage line 22 extends to opposing sides of the upper non-display region and is connected to output pads of the first and last circuit films 6 shown in FIG. 1 through two first common pads 21. The first common storage line 22 receives a common voltage from a power source (not shown) mounted on the PCB 2 shown in FIG. 1 via the PCB 2 and the circuit films 6, and commonly supplies the common voltage to the storage lines SL1 to SLn.

The second common storage line 24 is formed in the lower non-display region of the TFT substrate 11 and is connected commonly to the lower part of the storage lines SL1 to SLn through the second contact electrodes 30. The second common storage line 24 extends to opposing sides of the lower non-display region and includes a bent portions at each opposing end. The second common storage line 24 further extends from the bent portions to the upper side along the right and left non-display regions and is connected to output pads of the first and last circuit films 6 shown in FIG. 1 through two second common pads 23. At this time, the second common storage line 24 extends to the upper side via passing by an outer side or outbound side of the first and second gate drivers 12 and 14 in the left and right non-display regions, respectively. Therefore, the second common storage line 24 receives the common voltage from the power source (not shown) mounted on the PCB 2 shown in FIG. 1 via the PCB 2 and the circuit films 6, and commonly supplies the common voltage to the storage lines SL1 to SLn.

The first and second common storage lines 22 and d24 are formed of a gate metal by the same mask process as the gate lines of the display region. The first and second contact electrodes 30 and 32 and the pixel electrodes 46 of the display region are formed of a transparent conductive layer by the same mask process.

Figure 4:
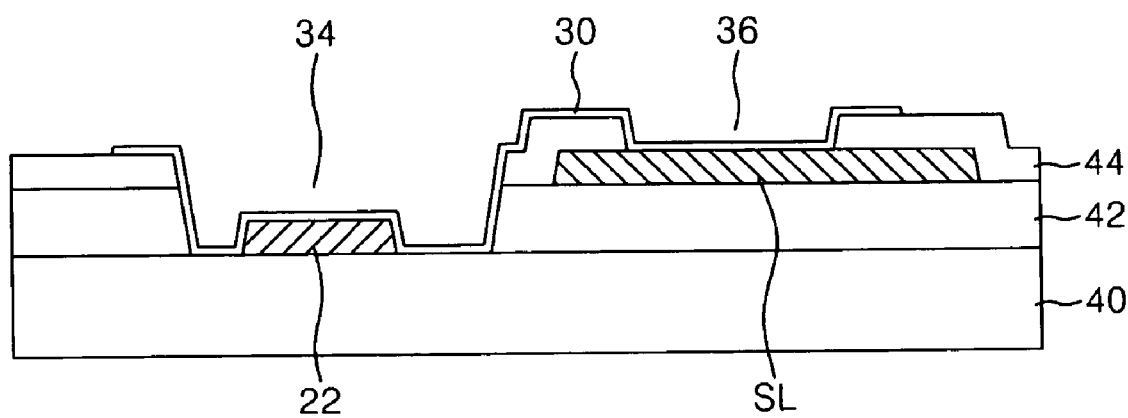
FIG. 4 is an enlarged cross-sectional view of a connector of a storage line shown in FIG. 2.

As illustrated in FIG. 4 for example, the first contact electrode 30 is connected to the first common storage line 22 and the storage line SL through first and second contact holes 34 and 36. The first common storage line 22 is formed of a gate metal on the insulating substrate 40 and the gate insulating layer 42 is formed on the first common storage line 22. The storage line SL is formed of a source/drain metal on the gate insulating layer 42 and the passivation layer 44 is formed on the storage line SL. The first contact hole 34 penetrates the passivation layer 44 and the gate insulating layer 42 to expose a part of the first common storage line 22, and the second contact hole 36 penetrates the passivation layer 44 to expose a part of the storage line SL. The first contact electrode 30 formed on the passivation layer 44 connects the first common storage line 22 to the storage line SL via the first and second contact holes 34 and 36. The second contact electrode 32 connects the second common storage line 24 to the storage line SL by the same structure as the first contact electrode 30 shown in FIG. 4.

Figure 5:
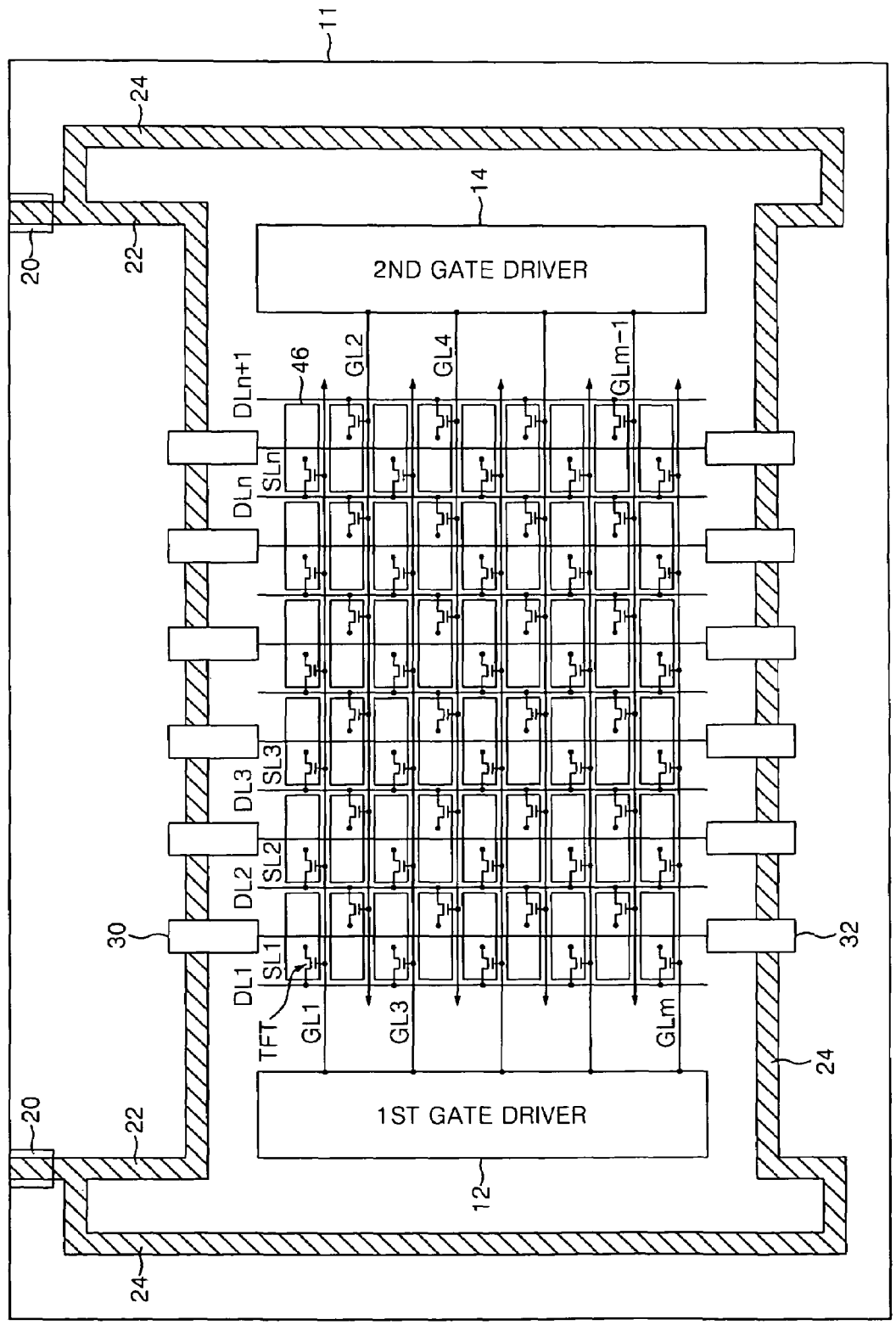
FIG. 5 is a diagram illustrating another exemplary embodiment of a TFT substrate of an LCD panel according to the present invention.

The first common pad 21 connected to the first common storage line 22 and the second common pad 23 connected to the second common storage line 24 are separately formed as shown in FIG. 2 and connected to the output pads provided in the circuit film 6 shown in FIG. 1. Alternatively, the first and second common storage lines 22 and 24 are connected to the output pads provided in the circuit film 6 shown in FIG. 1 through an identical common pad 20 as shown in FIG. 5. A plurality of gate driving signal input pads (not shown) are positioned between the first and second common pads 21 and 23 that are connected to one circuit film 6 and separated from each other. The plurality of gate driving signal input pads are connected to a plurality of gate driving signal supply lines connected to the gate drivers 12 and 14 and supplies to the gate drivers 12 and 14 a plurality of gate driving signals received via the circuit film 6 from the power source and timing controller 4 on the PCB 2 shown in FIG. 1.

As described above, the LCD panel according to the present invention reduces the number of data lines by arranging the R, G and B subpixels in the vertical direction. The long sides of the R, G and B subpixels are formed in parallel with the gate lines and the short sides thereof are formed in parallel with the data lines. The storage lines are formed in parallel with the data lines to pass through the subpixels in the direction of the short sides. Therefore, a reduction of an aperture ratio caused by the storage lines is minimized and the aperture ratio can be ensured compared to the storage lines passing through the subpixels in the direction of the long sides.

As apparent from the foregoing description, the manufacturing method of an LCD panel according to the present invention array the R, G and B subpixels in the vertical direction to reduce the number of the data lines. The storage lines are formed in parallel with the data lines and pass through the subpixels in the direction of short sides. Therefore, a reduction of an aperture ratio caused by the storage lines is minimized and the aperture ratio can be ensured.

Moreover, the first and second common storage lines are simultaneously connected to the upper and lower parts of a plurality of storage lines. Therefore, even if any one of the common storage lines is shorted, the other common storage line can supply the common voltage to the storage lines.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A liquid crystal display (LCD) panel, comprising:
a plurality of subpixels constituting a display region;
a plurality of thin film transistors (TFTs) connected respectively to the plurality of subpixels;
a plurality of gate lines connected to the TFTs and formed along long sides of the subpixels;
a plurality of data lines connected to the TFTs and formed along short sides of the subpixels;
a plurality of storage lines formed to pass through the subpixels along the short sides of the subpixels;
a first common storage line connected commonly to one end of each of the plurality of storage lines; and
a second common storage line connected commonly to the opposite other end of each of the plurality of storage lines.

2. The LCD panel as claimed in claim 1, wherein the plurality of subpixels includes red, green and blue subpixels, and the red, green and blue subpixels are alternately repeatedly arrayed along the data lines.

3. The LCD panel as claimed in claim 2, wherein the first and second common storage lines are formed of a first metal layer which is the same as the gate lines, and the storage lines are formed of a second metal layer which is the same as the data lines.

4. The LCD panel as claimed in claim 3, further comprising:
   a plurality of first contact electrodes for connecting the first common storage line to the plurality of storage lines; and
   a plurality of second contact electrodes for connecting the second common storage line to the plurality of storage lines.

5. The LCD panel as claimed in claim 4, wherein each of the first and second contact electrodes is formed of a third conductive layer for connecting the common storage lines to the storage lines through contact holes exposing the common storage lines and the storage lines.

6. The LCD panel as claimed in claim 3, wherein the first common storage line is connected to an upper part of the plurality of storage lines via an upper non-display region of a non-display region encompassing the display region, and the second common storage line is connected to a lower part of the plurality of storage lines via a lower non-display region.

7. The LCD panel as claimed in claim 6, wherein the second common storage line extends to the upper non-display region along right and left non-display regions in the lower non-display region.

8. The LCD panel as clamed in claim 7, further comprising:
   a first common pad connected to opposing ends of the first common storage line; and
   a second common pad connected to opposing ends of the second common storage line.

9. The LCD panel as claimed in claim 8, further comprising gate drivers disposed at the right and left non-display regions, for separately driving the plurality of gate lines.

10. The LCD panel as claimed in claim 9, wherein the second common storage line passes by an outbound side of the gate drivers.

11. The LCD panel as claimed in claim 7, further comprising a common pad connected commonly to opposing ends of each of the first and second common storage lines.

* * * * *

UNITED STATES PATENT AND TRADEMARK OFFICE
CERTIFICATE OF CORRECTION

| | | |
|---|---|---|
| PATENT NO. | : 7,586,550 B2 | Page 1 of 1 |
| APPLICATION NO. | : 11/487075 | |
| DATED | : September 8, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 123 days.

Signed and Sealed this
Twenty-second Day of February, 2011

David J. Kappos
*Director of the United States Patent and Trademark Office*